United States Patent [19]

Horike et al.

[11] 4,365,255

[45] Dec. 21, 1982

[54] INK JET PRINTER

[75] Inventors: Masanori Horike, Yokohama; Koichiro Jinnai, Kawasaki; Kyuhachiro Iwasaki, Fujisawa; Yutaka Kodama, Tokyo, all of Japan

[73] Assignee: Ricoh Co., Ltd., Tokyo, Japan

[21] Appl. No.: 211,200

[22] Filed: Nov. 28, 1980

Related U.S. Application Data

[63] Continuation of Ser. No. 23,320, Mar. 23, 1979, abandoned.

[30] Foreign Application Priority Data

Apr. 7, 1978 [JP] Japan ................................ 53-41041

[51] Int. Cl.³ ............................................ G01D 15/18

[52] U.S. Cl. ...................................................... 346/75

[58] Field of Search .......................................... 346/75

[56] References Cited

U.S. PATENT DOCUMENTS 3,938,163 2/1976 Fujimoto .............................. 346/75

4,075,636 2/1978 Galetto ................................ 346/75

*Primary Examiner*—Joseph W. Hartary

*Attorney, Agent, or Firm*—Burgess, Ryan and Wayne

[57] ABSTRACT

In an ink jet printer of the type wherein an ink jet nozzle continuously ejects the train of ink droplets and only ink droplets which are directed towards a recording surface are electrically charged and deflected by a pair of deflection electrodes so as to dot-form a character, a pair of auxiliary or compensation electrodes are provided in order to eliminate or control the inclination relative to the vertical line of dot-formed characters due to the relative speed between the recording surface and the ink jet nozzle.

1 Claim, 5 Drawing Figures

INK JET PRINTER

This is a continuation of application Ser. No. 23,320, filed Mar. 23, 1979, now abandoned.

BACKGROUND OF THE INVENTION

The present invention relates to an improved ink jet printer.

In respect to the conventional ink jet printers of the type wherein there is provided an oscillation device causing the oscillation of an ink jet nozzle, the number of ink droplets formed is a function of the oscillation frequency of the oscillation device. As a result, when the oscillation frequency is constant, the inclination relative to the vertical line of a dot-formed character varies depending upon the relative speed between the ink jet nozzle and a recording surface. Therefore the inclination of a dot-formed character due to the change in printing speed for instance from 250 words per minute to 500 words per minute can be corrected by changing the oscillation frequency or changing the number of ink droplets with which character is formed. However the prior art ink jet printers of the type described have a defect that distortions of dot-formed characters inevitably result on the occasion of the printing action when the relative speed is changing as in the case of starting of a motor.

SUMMARY OF THE INVENTION

Accordingly, one of the objects of the present invention is to provide an ink jet printer which may eliminate the inclination relative to the vertical line of dot-formed characters due to the variations in the relative speed between an ink jet nozzle and a recording surface and the resultant distortions of dot-formed characters.

To this end, the present invention provides an ink jet printer comprising an ink jet nozzle disposed for movement in parallel with a recording surface, a charging electrode for charging the ink droplets formed by said ink jet nozzle, a pair of deflection electrodes for causing the ink particles to deflect in the direction perpendicular to the direction of the movement of said ink jet nozzle depending upon the total charge on each ink droplet, and a pair of auxiliary or compensation electrodes which produces an electric field in the direction of the movement of said ink jet nozzle depending upon the relative speed between said ink jet nozzle and said recording surface, whereby a correction or compensation voltage is applied to said auxiliary or compensation electrodes so as to control the inclination of a character to be dot-formed depending upon the relative speed.

DESCRIPTION OF THE PREFERRED EMBODIMENTS

Figure 1:
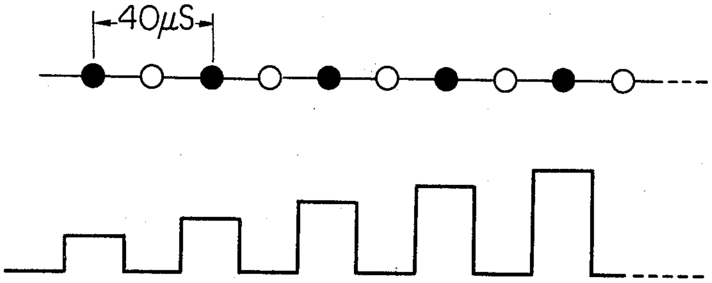
FIG. 1 shows the relationship between the ink droplet charging pulses and ink droplets.

As shown in FIG. 1, the ink droplets formed by the ejection of ink through a nozzle are alternately charged (the black dots indicate the droplets charged while the white dots the droplets not charged) in order to avoid the adverse effects caused by the reactions between the ink droplets. It is seen that the total charge on each ink droplet that is charged is dependent upon the crest value of the corresponding rectangular waveform. The deflection of the ink droplet is dependent upon the total charge on it and the deflection voltage. Therefore when the deflection voltage is maintained constant, the deflection of the ink droplet is dependent upon the total charge on it.

In FIG. 1, the nozzle is operated at a frequency of 50 KHz so that the charged ink droplets are spaced in time from each other by 40 microseconds.

Figure 2:
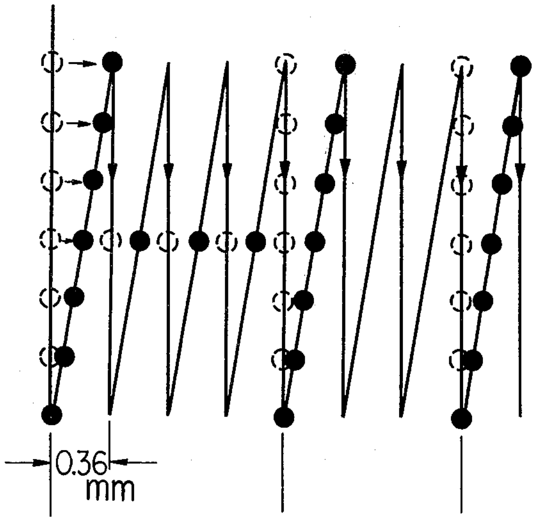
FIG. 2 is a view used for the explanation why the inclination relative to the vertical line of a dot-formed character occurs.

FIG. 2 is a view used for the explanation of the distortions of vertical lines of dot-formed characters. That is, the deflections of the alternately charged ink droplets are progressively increased as they form a vertical line. It is assumed that characters are formed with a $7\times5$ dot array with the spacing between the columns being 0.36 mm and that the charged ink droplets are spaced in time by 40 microseconds as described above. Then the relative velocity V between the nozzle tip and a recording medium or an ink droplet receiving surface is given by:

$$V = \frac{0.36 \times 10^{-3}}{40 \times 10^{-6} \times 7} = 1.29 \text{ m/sec}$$

And the recording or printing speed is given by:

$$\frac{1}{7 \times 7 \times 40 \times 10^{-6}} = 510 \text{ characters/sec}$$

It is apparent from FIG. 2 that the angle of inclination of the vertical lines of a character with respect to the vertical line is in proportion to the deflection. In practice, however, the more the charged ink droplet is deflected, the longer its traveling path becomes. As a result, the angle of inclination is further increased.

Figure 3:
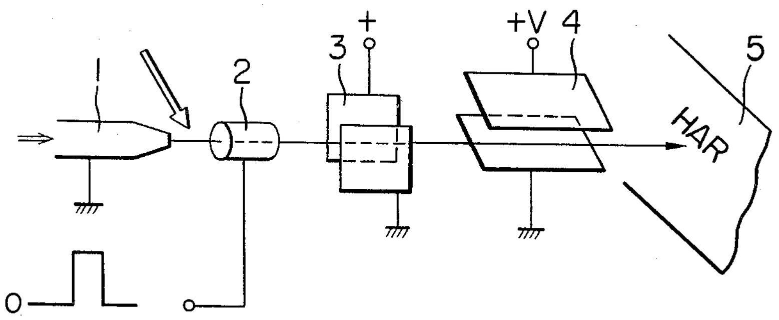
FIG. 3 is an illustration of the simplest form of an ink jet printer in accordance with the present invention.

FIG. 3 is an illustration of the simplest form of the ink jet printer in accordance with the present invention comprising a nozzle 1, an ink droplet charging electrode 2, a pair of distortion compensation electrodes 3, a pair of deflection electrodes 4 and a paper tape 5 upon which the ink droplets ejected from the nozzle 1 are directed. The distortion compensation electrodes 3 are interposed between the charging electrode 2 and the deflection electrodes 4 and generate the electric field in parallel with the direction (indicated by the arrow) of the movement of the nozzle 1 so that the distortions of the vertical lines of the characters which are dot-formed may be avoided. In general, the ink droplets are negatively charged so that the compensation electrodes 3 are connected to voltage sources with the polarities as shown. As a result, the more the ink droplet is charged and the more it is deflected vertically, the more it is deflected horizontally in the direction of the movement of the nozzle 1, whereby the inclination relative to the vertical lines of the dot-formed characters may be avoided.

Figure 4:
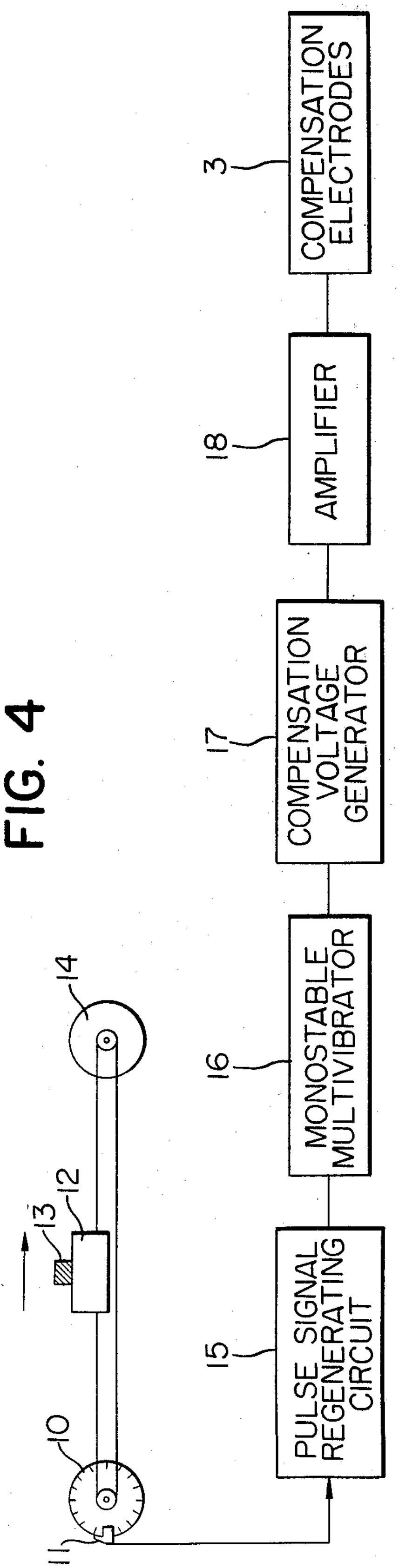
FIG. 4 is a view illustrating an embodiment of the present invention which may eliminate the distortions of dot-formed characters due to the variations in printing speed.

In FIG. 4 is shown another embodiment of the present invention which may eliminate the distortions of the dot-formed characters due to the variations in printing or dot forming speed. In its simplest form, it comprises a timing disk 10, a light sensor 11, a carriage 12, a jet nozzle 13 mounted on the carriage 12, a servomotor 14, a pulse signal regenerating circuit 15, a monostable multivibrator 16, a compensation voltage generating circuit 17, and an amplifier 18 connected to the compensation electrodes 3.

In operation, the servomotor 14 drives the carriage 12 with the nozzle 13, and with the timing disk 10 and the light sensor 11, the output pulses the frequency of which represents the printing-scanning speed are derived in a manner well known in the art and are applied to the pulse signal regenerating circuit 15 which amplifies and reshapes the input pulses. The output pulses from the circuit 15 are applied to the monostable multivibrator 16 so that they may be converted into pulses with a predetermined pulse duration. The output pulses from the vibrator 16 is applied to the compensation voltage generator 17 so as to be converted into the direct current (DC). The DC output from the generator 17 is amplified by the amplifier 18 and is applied to the compensation electrode 3, whereby the distortions of dot-formed characters due to the variations in the printing-scanning speed may be eliminated.

Figure 5:
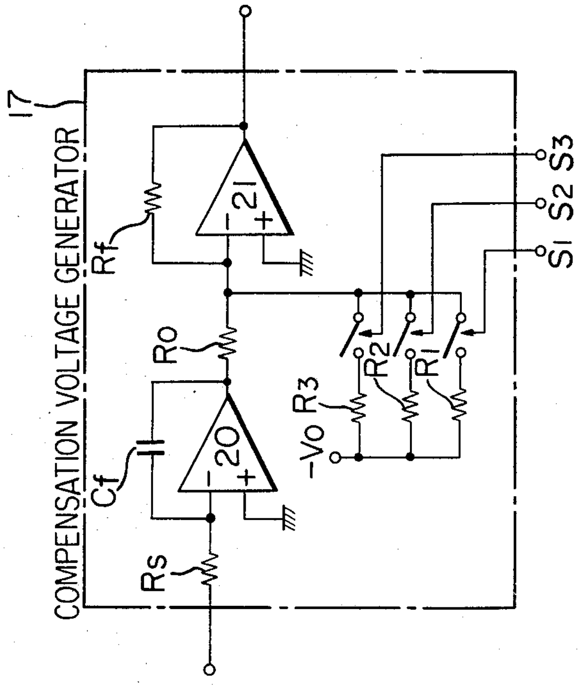
FIG. 5 is a circuit diagram of a compensation voltage generating circuit shown in FIG. 4.

In FIG. 5 is shown an illustration of the compensation voltage generating circuit 17 shown in FIG. 4. It comprises operational amplifiers 20 and 21, resistors Rs, Ro, Rf, $R_1$, $R_2$ and $R_3$ and a capacitor $C_f$. The operational amplifier 20, the resistor Rs and the capacitor $C_f$ constitute an integrator. When the input pulse Vs(t) representative of the scanning speed is applied to it, it gives the output Vo(t).

$$Vo(t) = -\frac{1}{C_f R_s}\int_0^t Vs(t)dt$$

This output Vo(t) is amplified by the operational amplifier 21 into $Vo(t)R_f/R_o$. The latter is further amplified and applied to the compensation electrodes 3, whereby the inclination of the vertical lines of dot-formed characters may be eliminated even when the scanning speed varies.

Furthermore, a signal may be applied to one of the terminals $S_1$, $S_2$ and $S_3$ so as to connect $-Vo$ to the inverting input terminal (−) of the operational amplifier 21 through one of the resistors $R_1$, $R_2$ and $R_3$ so that the input voltage impressed on the inverting input terminal (−) may be varied. As a result, depending upon the types of characters such as alphanumeric, katakana (one type of the Japanese characters) and other symbols the inclination of dot-formed characters may be varied as desired.

What is claimed is:

1. An ink jet printer, comprising:

an ink jet nozzle disposed for movement in parallel with a recording surface;

a charging electrode for charging ink droplets formed by the ejection of ink through said ink jet nozzle;

a pair of electrostatic deflection electrodes for producing an electric field which may deflect the ink droplets in the direction perpendicular to the direction of the movement of said ink jet nozzle depending upon the total charge on each ink droplet;

a pair of electrostatic compensation electrodes disposed orthogonal to said deflection electrodes for producing an electric field in the direction in which said ink jet nozzle is moved;

a printing-scanning speed detecting device for sensing the relative speed between said recording surface and said ink jet nozzle; and a compensation voltage generating circuit responsive to the output of said speed detecting device for applying to said compensation electrodes a D.C. compensation electrode drive signal proportional to the relative speed between said recording surface and said ink jet nozzle, said circuit comprising:

a pulse generating means for generating pulses at a rate corresponding to said relative speed;

integrating means coupled to said pulse generating means for integrating said pulses to provide an output signal having a level corresponding to said relative speed;

a variable gain amplifier coupled to said integating means and responsive to said output signal for providing a D.C. compensation electrode drive signal having a voltage level proportional to the level of said output signal, said compensation electrode drive signal being coupled to said compensation electrodes; and setting means for setting the gain of said amplifier in accordance with a desired inclination angle of characters to be printed by said ink droplets on said recording surface, whereby the inclination of characters to be printed is varied in accordance with the relative speed between said recording surface and said ink jet nozzle to render the angle of inclination of characters printed on said recording surface by said ink drops substantially independent of said relative speed, without mechanical tilting or rotation of any of said electrodes.

* * * * *